United States Patent
Ono et al.

(10) Patent No.: US 9,564,646 B2
(45) Date of Patent: Feb. 7, 2017

(54) FUEL CELL SYSTEM AND OPERATING METHOD THEREOF

(75) Inventors: Takashi Ono, Kirishima (JP); Takashi Shigehisa, Kirishima (JP); Eizou Matsui, Kirishima (JP); Shinpei Shiraishi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 291 days.

(21) Appl. No.: 13/990,590

(22) PCT Filed: Nov. 30, 2011

(86) PCT No.: PCT/JP2011/077671
§ 371 (c)(1),
(2), (4) Date: May 30, 2013

(87) PCT Pub. No.: WO2012/074005
PCT Pub. Date: Jun. 7, 2012

(65) Prior Publication Data
US 2013/0266879 A1    Oct. 10, 2013

(30) Foreign Application Priority Data

Nov. 30, 2010 (JP) ................. 2010-266361
Dec. 24, 2010 (JP) ................. 2010-288122

(51) Int. Cl.
*H01M 8/04* (2016.01)
*H01M 8/06* (2016.01)

(52) U.S. Cl.
CPC ..... *H01M 8/04298* (2013.01); *H01M 8/04223* (2013.01); *H01M 8/0606* (2013.01); *Y02E 60/50* (2013.01)

(58) Field of Classification Search
None
See application file for complete search history.

(56) References Cited

U.S. PATENT DOCUMENTS

2004/0038095 A1  2/2004 Kushibiki et al.
2005/0026022 A1  2/2005 Joos
(Continued)

FOREIGN PATENT DOCUMENTS

JP   2004-185917 A   7/2004
JP   2006-066244 A   3/2006
(Continued)

OTHER PUBLICATIONS

Japanese Office Action with a concise explanation thereof corresponding to Japanese Patent Appln. No. 2012-546913 dated Jan. 21, 2014.
(Continued)

*Primary Examiner* — Daniel Gatewood
(74) *Attorney, Agent, or Firm* — Volpe and Koenig, P.C.

(57) ABSTRACT

A fuel cell system includes a fuel cell that generates electric power using fuel gas and oxygen-containing gas and combusts fuel gas remaining unused for generation of electric power; a fuel gas supply line that supplies the fuel gas to the fuel cell; and an on-off valve disposed in the fuel gas supply line. A shutdown transition mode in which the fuel gas in the fuel gas supply line downstream from the on-off valve is supplied to the fuel cell at a flow rate smaller than that at a time of generation of electric power and is combusted therein after the on-off valve is closed, and a shutdown mode which is started after the shutdown transition mode are provided as an emergency shutdown mode in which the fuel cell undergoes emergency shutdown when the on-off valve of the fuel gas supply line is closed.

4 Claims, 10 Drawing Sheets

(56) References Cited

U.S. PATENT DOCUMENTS

2007/0298298 A1* 12/2007 Ishigaki ............ H01M 8/04014
   429/429
2011/0076573 A1*  3/2011 Akikusa et al. .............. 429/413

FOREIGN PATENT DOCUMENTS

| JP | 2006-073415 A |   | 3/2006 |
|----|---------------|---|--------|
| JP | 2006-294508 A |   | 10/2006 |
| JP | 2006294508 A  | * | 10/2006 |
| JP | 2007-012313 A |   | 1/2007 |
| JP | 2009-087862 A |   | 4/2009 |
| JP | 2009-295380 A |   | 12/2009 |
| JP | 2009-301971 A |   | 12/2009 |
| JP | 2009301971 A  | * | 12/2009 |
| JP | 2010-027579 A |   | 2/2010 |
| JP | 2010-055910 A |   | 3/2010 |
| JP | 2010055910 A  | * | 3/2010 |

OTHER PUBLICATIONS

Extended European Search Report, European Patent Application No. 11845630.0, Jun. 25, 2015, 7 pgs.

* cited by examiner

FIG. 2
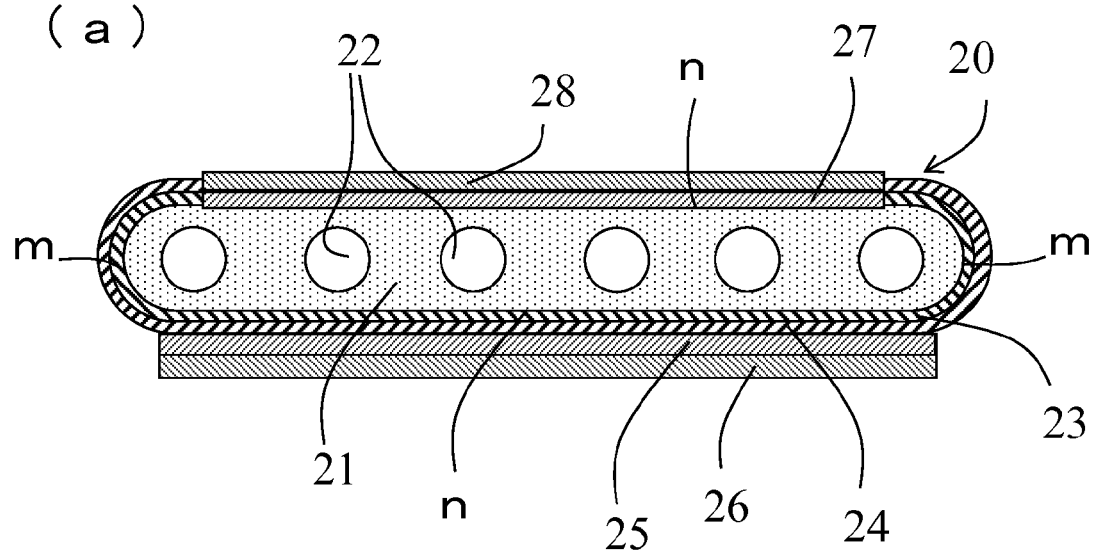
(a)
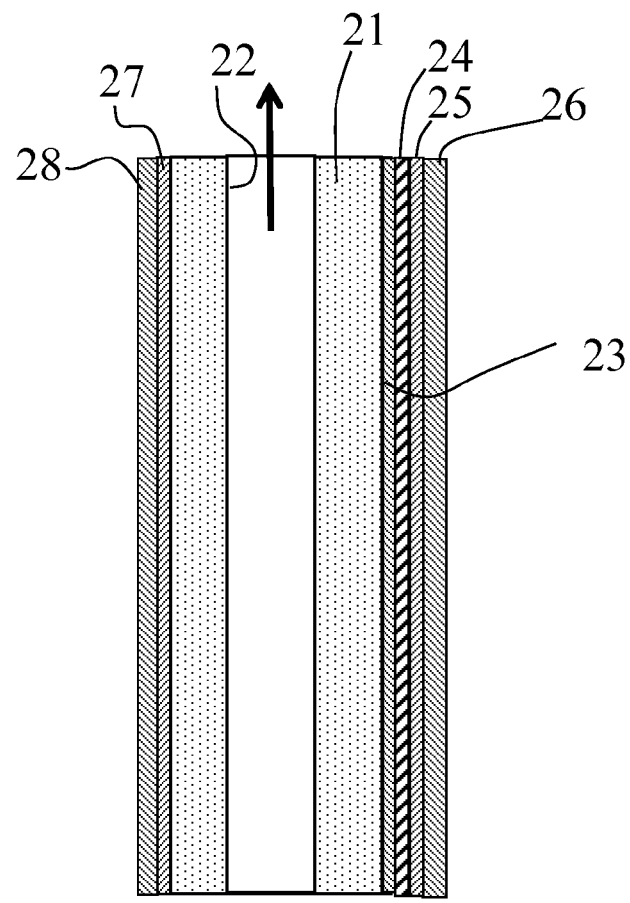
(b)

FIG. 3
(a)
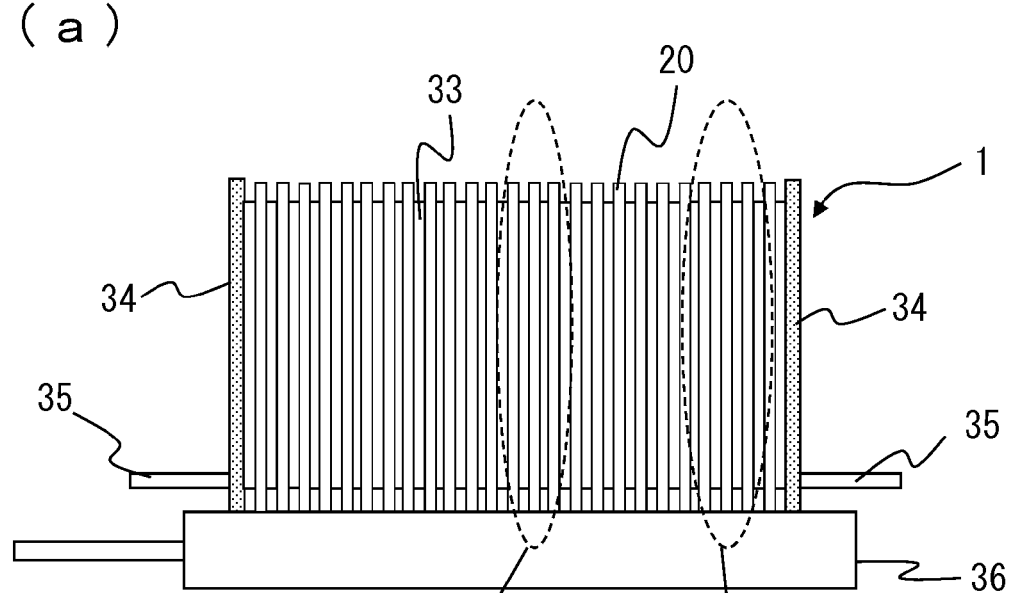
(b)
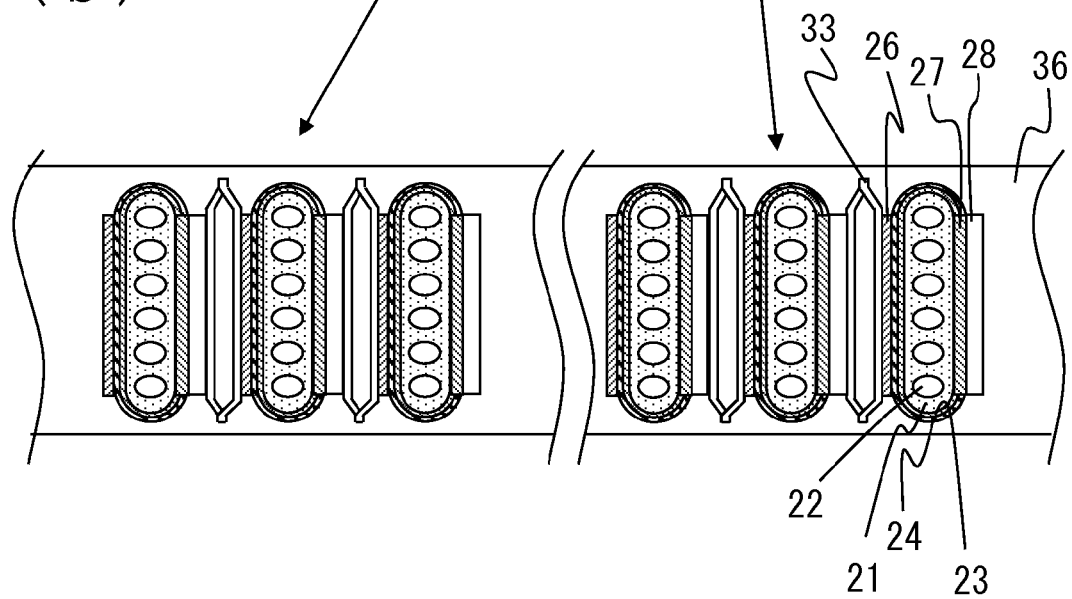

FIG. 6
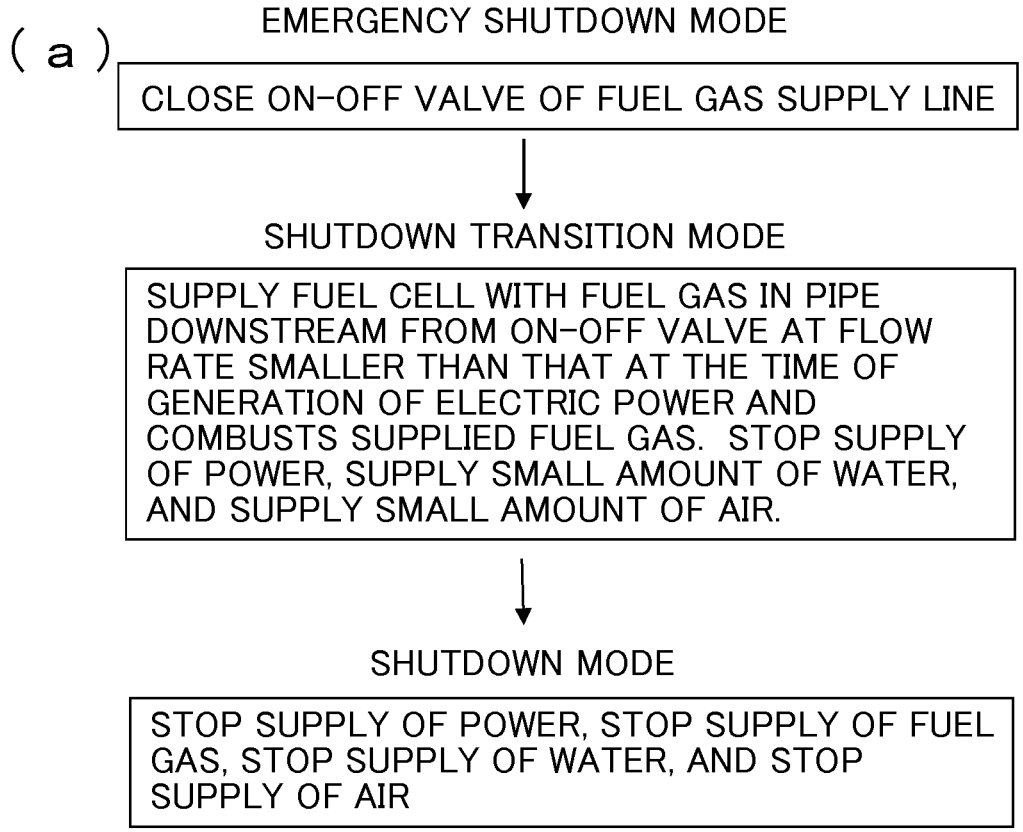
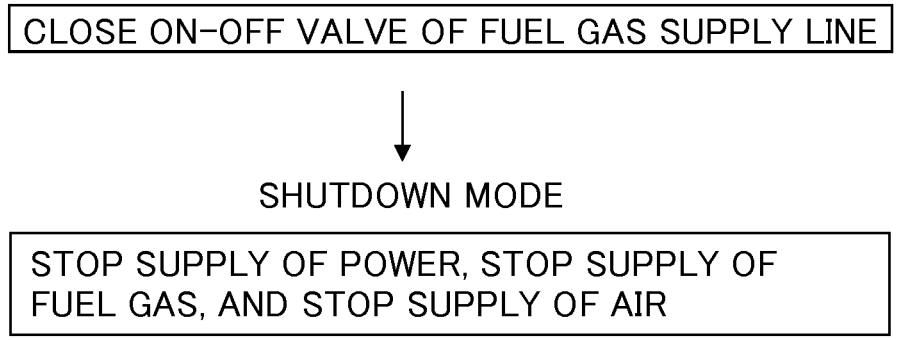

FIG. 7

EMERGENCY SHUTDOWN MODE

| CLOSE ON-OFF VALVE OF FUEL GAS SUPPLY LINE |

SHUTDOWN TRANSITION MODE

| SUPPLY FUEL CELL WITH FUEL GAS IN PIPE DOWNSTREAM FROM ON-OFF VALVE AT FLOW RATE SMALLER THAN THAT AT THE TIME OF GENERATION OF ELECTRIC POWER AND COMBUSTS SUPPLIED FUEL GAS. STOP SUPPLY OF POWER, STOP SUPPLY OF WATER, AND STOP SUPPLY OF AIR. |

SHUTDOWN MODE

| STOP SUPPLY OF POWER, STOP SUPPLY OF FUEL GAS, STOP SUPPLY OF WATER, AND STOP SUPPLY OF AIR |

FIG. 8
(a)
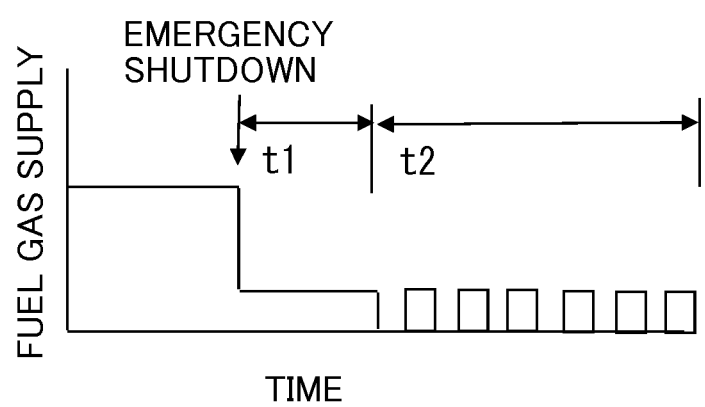
(b)
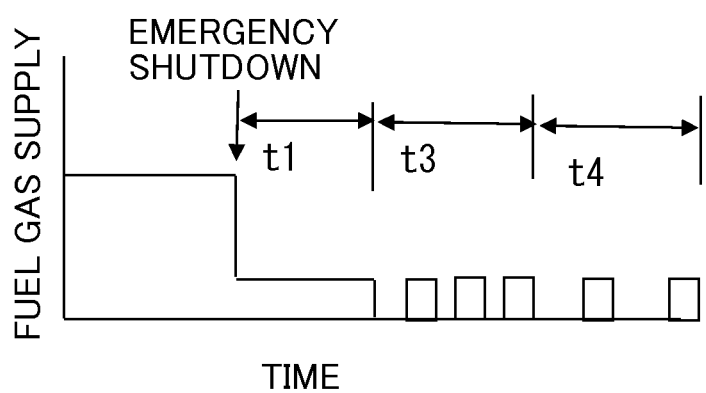

FUEL CELL SYSTEM AND OPERATING METHOD THEREOF

TECHNICAL FIELD

The present invention relates to a fuel cell system including an emergency shutdown mode in which a fuel cell undergoes emergency shutdown due to natural disasters such as an earthquake, a power failure, a striking of a bolt of lightning, or a typhoon, and an operating method thereof.

BACKGROUND ART

Conventionally, a fuel cell system is known which uses a fuel cell such as a solid oxide fuel cell (SOFC) or a molten carbonate fuel cell (MCFC). A solid oxide fuel cell operates in a high temperature range of about 600° C. to 1000° C. and a molten carbonate fuel cell operates in a high temperature range of about 500° C. to 900° C.

Conventionally, when the supply of raw fuel gas to a fuel cell system is stopped due to natural disasters such as an earthquake, a power failure, a striking of a bolt of lightning, or a typhoon, the fuel cell system undergoes emergency shutdown (for example, see Patent Literature 1).

A fuel cell system is also known in which a raw fuel line is provided with an adsorber adsorbing raw fuel gas and the supply of raw fuel gas is stopped using a supply shutdown valve disposed in the raw fuel line and a discharging pump is activated to discharge the raw fuel gas from the adsorber to the fuel cell at the time of emergency shutdown (for example, see Patent Literature 2).

CITATION LIST

Patent Literature

[Patent Literature 1] Japanese Unexamined Patent Publication JP-A 2006-66244
[Patent Literature 2] Japanese Unexamined Patent Publication JP-A 2010-27579

SUMMARY OF INVENTION

However, when a high-temperature operating fuel cell system undergoes emergency shutdown, for example, in a high-temperature operating fuel cell system using a solid oxide fuel cell, electric power generation is stopped in the course of generating electric power due to the emergency shutdown. Accordingly, since the solid oxide fuel cell rapidly falls in temperature from the temperature of about 600° C. to 1000° C., there is a possibility that large thermal stress would be generated in the solid oxide fuel cell and the solid oxide fuel cell would be damaged due to the thermal stress.

Particularly, in such a type of fuel cell system having a fuel cell generating electric power using fuel gas and oxygen-containing gas and combusting fuel gas remaining for generation of electric power, since the combustion is stopped in a combusting state, the combustion side of the fuel cell rapidly falls in temperature and there is thus a possibility that large thermal stress would be generated.

In Patent Literature 2, since hydrogen can be supplied to the fuel cell at the time of emergency shutdown, oxidation of a fuel electrode in the fuel cell can be suppressed. However, Patent Literature 2 does not disclose that the fuel gas is combusted at the time of emergency shutdown. Accordingly, there is a possibility that large thermal stress would be generated in the solid oxide fuel cell and the solid oxide fuel cell would be damaged due to the thermal stress.

An object of the invention is to provide a fuel cell system capable of reducing thermal stress which acts on a fuel cell at the time of emergency shutdown, and an operating method thereof.

A fuel cell system of the invention includes: a fuel cell that generates electric power using fuel gas and oxygen-containing gas and combusts fuel gas remaining unused for generation of electric power; a fuel gas supply line that supplies the fuel gas to the fuel cell; and an on-off valve disposed in the fuel gas supply line, a shutdown transition mode in which the fuel gas in the fuel gas supply line downstream from the on-off valve is supplied to the fuel cell at a flow rate smaller than that at a time of generation of electric power and is combusted therein after the on-off valve is closed, and a shutdown mode which is started after the shutdown transition mode, being provided as an emergency shutdown mode in which the fuel cell undergoes emergency shutdown when the on-off valve of the fuel gas supply line is closed.

In addition, a fuel cell system of the invention includes: a fuel cell that generates electric power using fuel gas and oxygen-containing gas and combusts fuel gas remaining unused for generation of electric power; a reformer that reforms raw fuel gas to generate the fuel gas; a fuel gas supply line including a reformed fuel line that connects the reformer to the fuel cell and a raw fuel line that supplies the raw fuel gas to the reformer; an on-off valve disposed in the raw fuel line; and a pump disposed in the raw fuel line downstream from the on-off valve, the pump supplying the raw fuel gas in the raw fuel line downstream from the on-off valve to the reformer at a flow rate smaller than that at a time of generation of electric power when the on-off valve is closed.

A method of operating a fuel cell system including a fuel cell that generates electric power using fuel gas and oxygen-containing gas and combusts fuel gas remaining unused for generation of electric power, a fuel gas supply line that supplies the fuel gas to the fuel cell, and an on-off valve that is disposed in the fuel gas supply line, comprises: when the on-off valve of the fuel gas supply line is closed and the fuel cell undergoes emergency shutdown, supplying the fuel gas in the fuel gas supply line downstream from the on-off valve to the fuel cell at a flow rate smaller than that at a time of generation of electric power and combusting the fuel gas therein after the on-off valve is closed, and stopping the supply of the fuel gas to the fuel cell thereafter.

ADVANTAGEOUS EFFECTS OF INVENTION

In the fuel cell system according to the invention, it is possible to gradually lower the temperature of the fuel cell at the time of emergency shutdown without rapidly lowering the temperature and thus to reduce thermal stress in the fuel cell, thereby preventing damage of the fuel cell.

BRIEF DESCRIPTION OF DRAWINGS

FIG. 2 is a diagram illustrating a solid oxide fuel battery cell, where FIG. 2(a) is a transverse cross-sectional view and FIG. 2(b) is a longitudinal cross-sectional view;

FIG. 3 is a diagram illustrating an example of a fuel cell, where FIG. 3(a) is a side view schematically illustrating the fuel cell and FIG. 3(b) is a transverse cross-sectional view illustrating a partial enlargement of the fuel cell surrounded with a dotted line in FIG. 3(a);

FIG. 6 is a flowchart of an emergency shutdown mode, where FIG. 6(a) is a flowchart of the emergency shutdown mode in an embodiment of the invention and FIG. 6(b) is a flowchart of the emergency shutdown mode in the background art;

FIG. 7 is a flowchart illustrating another example of the emergency shutdown mode;

FIG. 8 is a diagram illustrating a fuel gas supply in a shutdown transition mode, where FIG. 8(a) is a graph illustrating a case where fuel gas continuously flows at a predetermined flow rate for a predetermined time and then intermittently flows and FIG. 8(b) is a graph illustrating a case where fuel gas continuously flows at a predetermined flow rate for a predetermined time, then intermittently flows, and then intermittently flows with a time interval therebetween;

DESCRIPTION OF EMBODIMENTS

Figure 1:
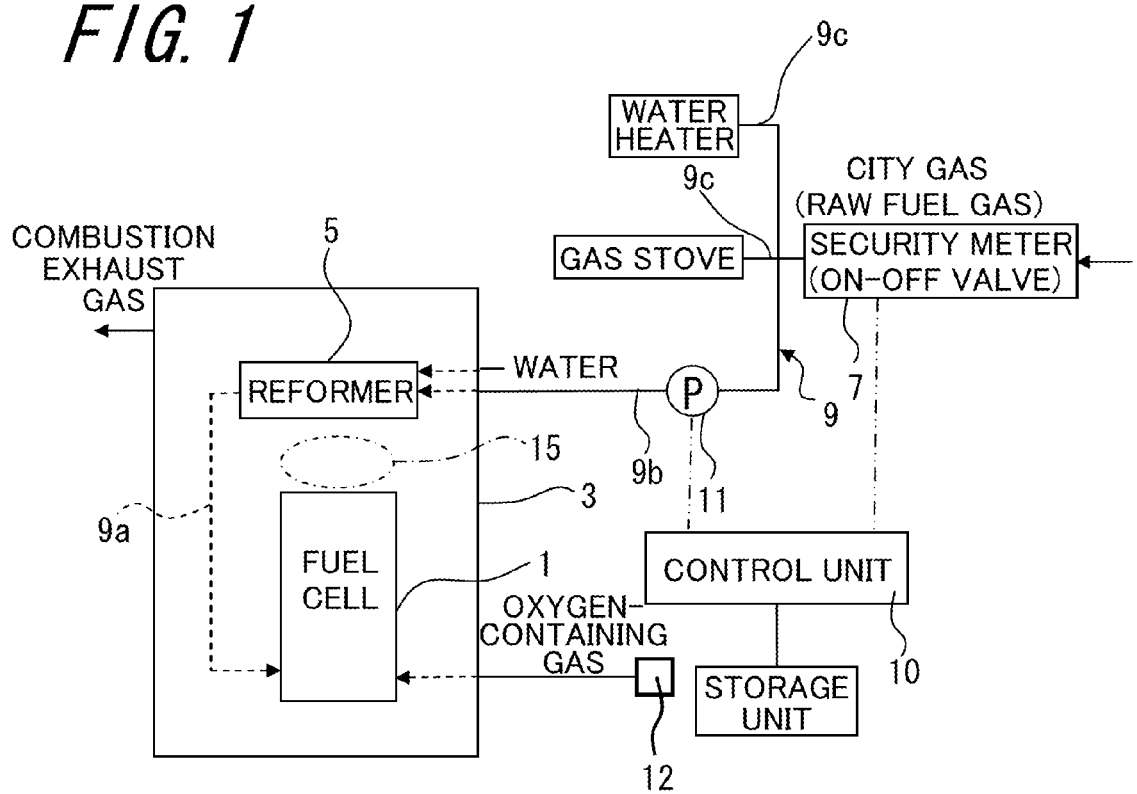
FIG. 1 is a diagram illustrating an example of a fuel cell system.

FIG. 1 shows a high-temperature operating fuel cell system according to an embodiment of the invention, where reference numeral 1 represents a solid oxide fuel cell 1 (hereinafter, also referred to as a fuel cell 1). The fuel cell 1 has a plurality of fuel battery cells electrically connected in series to each other. The fuel cell 1 will be described later.

The fuel cell 1 generates electric power using fuel gas and oxygen-containing gas. The fuel cell 1 is housed in a housing 3. The housing 3 also houses a reformer 5 and is configured to supply the fuel gas, which is obtained by causing the reformer 5 to reform raw fuel gas, to the fuel cell 1. A catalyst for reforming raw fuel gas such as city gas or propane gas is housed in the reformer 5.

The reformer 5 is configured to be supplied with raw fuel gas such as city gas, which is reformed into fuel gas, via a security meter 7. The security meter 7 is provided for each household. The usage amount of the raw fuel gas in the corresponding household is displayed on the security meter 7, and the security meter includes an on-off valve for stopping the supply of the raw fuel gas to the fuel cell system at the time of emergency of natural disasters such as an earthquake, a power failure, a striking of a bolt of lightning, or a typhoon. The security meter 7 is also a gas meter. The security meter 7 is configured to supply the raw fuel gas to, for example, a water heater and a gas stove, in addition to the fuel cell system, and includes a gas-appliance raw fuel line 9c for each gas appliance.

The reformer 5 and the fuel cell 1 are connected to each other with a reformed fuel line 9a supplying the fuel gas. The security meter 7 and the reformer 5 are connected to each other with a raw fuel line 9b supplying the raw fuel gas. The reformed fuel line 9a and the raw fuel line 9b constitute a fuel gas supply line 9. The reformed fuel line 9a, the raw fuel line 9b, and the gas-appliance raw fuel line 9c are formed of pipes. The security meter 7 having an on-off valve is disposed at an upstream end of the fuel gas supply line 9, that is, at an upstream end of the raw fuel line 9b.

A pump 11 supplying the raw fuel gas to the reformer 5 is disposed downstream in the fuel gas supply line 9, specifically, downstream from the on-off valve of the raw fuel line 9b. The pump 11 is connected to a control unit 10. The control unit 10 controls the amount of raw fuel gas supplied to the reformer 5 to control the amount of fuel gas supplied to the fuel cell 1 depending on a load, by controlling the pump 11.

The load means electrical appliances such as a refrigerator, a washing machine, or a microwave oven and is supplied with electric power generated by the fuel cell 1.

In FIG. 1, the gas-appliance raw fuel lines 9c are connected to the water heater and the gas stove, respectively. The gas-appliance raw fuel lines 9c are connected to the raw fuel line 9b of the fuel cell system.

A check valve (not shown) which is opened only at a pressure higher than a predetermined pressure is disposed downstream from the pump 11 in the fuel gas supply line 9, and stops the supply of the raw fuel gas when the pump 11 is shut down.

The reformer 5 is supplied with water. The water is changed to steam in the reformer 5 and reacts with the raw fuel gas such as city gas or propane gas to reform the raw fuel gas with the steam. In a steady state (power generation mode), the fuel gas is supplied from the reformer 5 to the fuel cell 1 and the oxygen-containing gas (hereinafter, air may also be described as the oxygen-containing gas) such as air is supplied to the housing 3, whereby the fuel cell 1 generates electric power. The fuel gas remaining unused for generation of electric power is combusted on the reformer 5 side in the fuel cell 1 by reacting with the oxygen-containing gas, and a combustion area 15 is formed between the fuel cell 1 and the reformer 5. The reformer 5 is heated by the combustion gas and the raw fuel gas in the reformer 5 is reformed into fuel gas containing hydrogen as a major component. An ignitor (not shown) such as a heater is disposed above the fuel cell 1 and ignites the fuel gas remaining unused for generation of electric power.

The fuel cell 1 has a plurality of fuel battery cells electrically connected in series and a fuel battery cell is shown in FIG. 2. FIG. 2(a) is a transverse cross-sectional view of a fuel battery cell 20 and FIG. 2(b) is a cross-sectional view of the fuel battery cell 20. Elements of the fuel battery cell 20 are partially enlarged in both views.

The fuel battery cell 20 is a fuel battery cell 20 having a hollow plate shape and includes a porous conductive support (hereinafter, also referred to as a support) 21 having a flat cross-section and an elliptic cylinder shape as a whole. A plurality of fuel gas flow channels 22 are formed in the length direction at a predetermined interval so as to penetrate the conductive support 21. The fuel battery cell 20 has a structure in which various members are formed on the conductive support 21.

The conductive support 21 includes a pair of flat surfaces n parallel to each other and arc-like surfaces (side surfaces) m connecting the pair of flat surfaces n to each other. Both flat surfaces n are substantially parallel to each other, a porous fuel electrode layer 23 is formed to cover one flat surface n (bottom surface) and both arc-like surfaces m, and a dense solid electrolyte layer 24 is stacked thereon to cover the fuel electrode layer 23. A porous air electrode layer 26 is stacked on the solid electrolyte layer 24 so as to face the fuel electrode layer 23 with a reaction preventing layer 25 interposed therebetween. An interconnector 28 is formed on the other flat surface n (top surface), on which the fuel electrode layer 23 and the solid electrolyte layer 24 are not stacked, with a close adhesive layer 27 interposed therebetween.

The conductive support 21 and the fuel electrode layer 23 contain metal, and Ni, Fe, and Co, and the like are known as examples of the metal. The fuel electrode layer 23 contains metal oxide in addition to metal, and stabilized zirconia or partially-stabilized zirconia is known as examples of the metal oxide.

That is, the fuel electrode layer 23 and the solid electrolyte layer 24 are formed to the other flat surface n (top surface) via the arc-like surfaces m on both sides, both ends of the interconnector 28 are located at both ends of the solid electrolyte layer 24, and the conductive support 21 is surrounded with the solid electrolyte layer 24 and the interconnector 28 so as not to leak the fuel gas flowing therein to the outside.

FIG. 3 is a diagram illustrating an example of the fuel cell 1 (also referred to as a cell stack) in which a plurality of fuel battery cells 20 are electrically connected in series with a power collecting member 33 interposed therebetween, where FIG. 3(a) is a side view schematically illustrating the fuel cell 1 and FIG. 3(b) is a partially-enlarged cross-sectional view of the fuel cell 1 in FIG. 3(a) and shows the enlargement of the part surrounded by a dotted line in FIG. 3(a). In FIG. 3(b), portions corresponding to parts surrounded by the dotted lines in FIG. 3(a) are guided by arrows so as to specify the portions. In the fuel battery cells 20 shown in FIG. 3(b), some members such as the reaction preventing layer 25 are not shown.

In the fuel cell 1, the fuel battery cells 20 are arranged with the power collecting member 33 interposed therebetween to form the fuel cell 1, and the bottom of each fuel battery cell 20 is fixed to a gas tank 36 supplying the fuel gas to the fuel battery cells 20 with an adhesive such as a glass sealant. Elastic conductive members 34 of which the bottom is fixed to the gas tank 36 are provided so as to pinch the plurality of fuel battery cells 20 from both ends in the arrangement direction of the fuel battery cells 20.

In the conductive member 34 shown in FIG. 3, a current drawing portion 35 for drawing out current generated by the power generation of the fuel cell 1 is disposed in a shape extending to the outside along the arrangement direction of the fuel battery cells 20.

Figure 4:
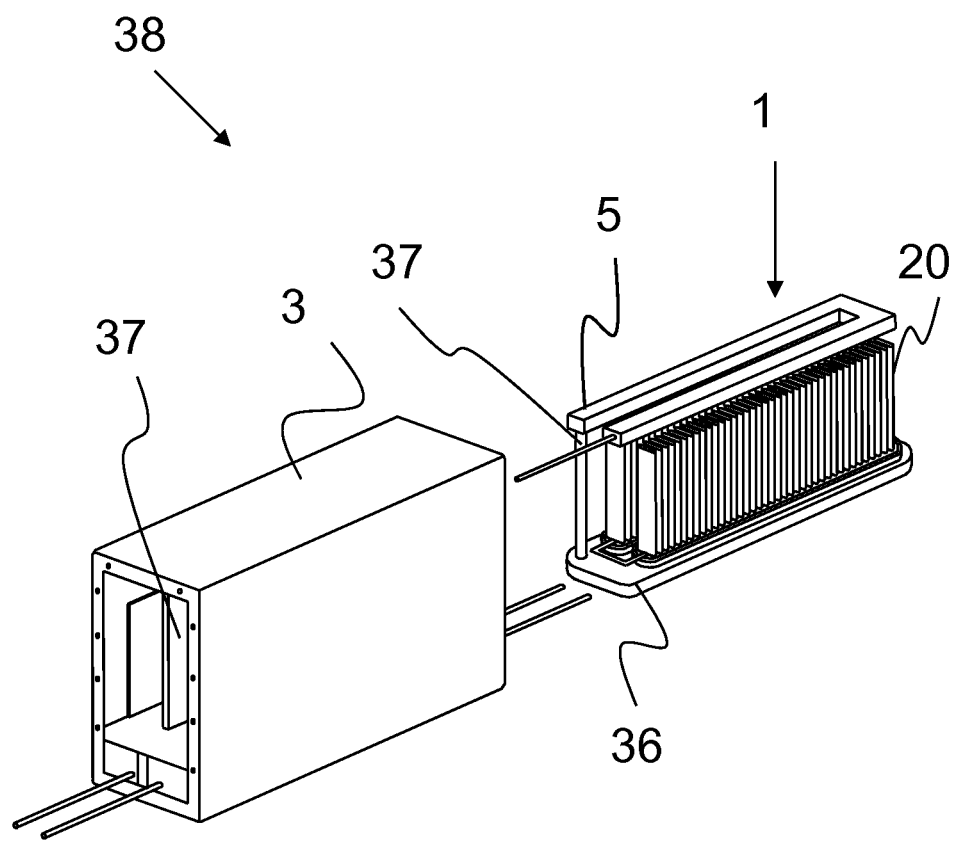
FIG. 4 is an exterior perspective view illustrating an example of a fuel cell module.

FIG. 4 is an exterior perspective view illustrating an example of a fuel cell module 38 in which the fuel cell 1 is housed in the housing 3, where the fuel cell 1 shown in FIG. 3 is housed in the housing 3 having a rectangular parallelepiped shape.

The reformer 5 is disposed above the fuel cell 1 so as to obtain the fuel gas used in the fuel battery cells 20. The fuel gas generated in the reformer 5 is supplied to the gas tank 36 via the reformed fuel line 37 and is supplied to the fuel gas flow channels 22 disposed in the fuel battery cells 20 via the gas tank 36.

FIG. 4 shows a state where a part (front and rear surfaces) of the housing 3 is removed and the fuel cell 1 and the reformer 5 housed therein are drawn out to the rear side. In the fuel cell module 38 shown in FIG. 4, the fuel cell 1 can be housed in the housing 3 in a sliding manner.

An oxygen-containing gas introducing member 37 disposed in the housing 3 is inserted into the fuel cell 1 installed in parallel to the gas tank 36 in FIG. 4. Oxygen-containing gas is supplied to the bottoms of the fuel battery cells 20 by the use of the oxygen-containing gas introducing member 37 so that the oxygen-containing gas flows from the bottom to the top through the sides of the fuel battery cells 20 to correspond to the flow of the fuel gas. By causing the fuel gas discharged from the fuel gas flow channels 22 of the fuel battery cells 20 to react with the oxygen-containing gas and to combust the fuel gas at the top ends of the fuel battery cells 20, it is possible to raise the temperature of the fuel battery cells 20 and thus to promote the startup of the fuel cell 1. By combusting the fuel gas discharged from the gas flow channels 22 of the fuel battery cells 20 at the top ends of the fuel battery cells 20, the reformer 5 disposed above the fuel battery cells 20 (the fuel cell 1) can be heated. Accordingly, it is possible to efficiently cause the reforming reaction by the use of the reformer 5.

Figure 5:
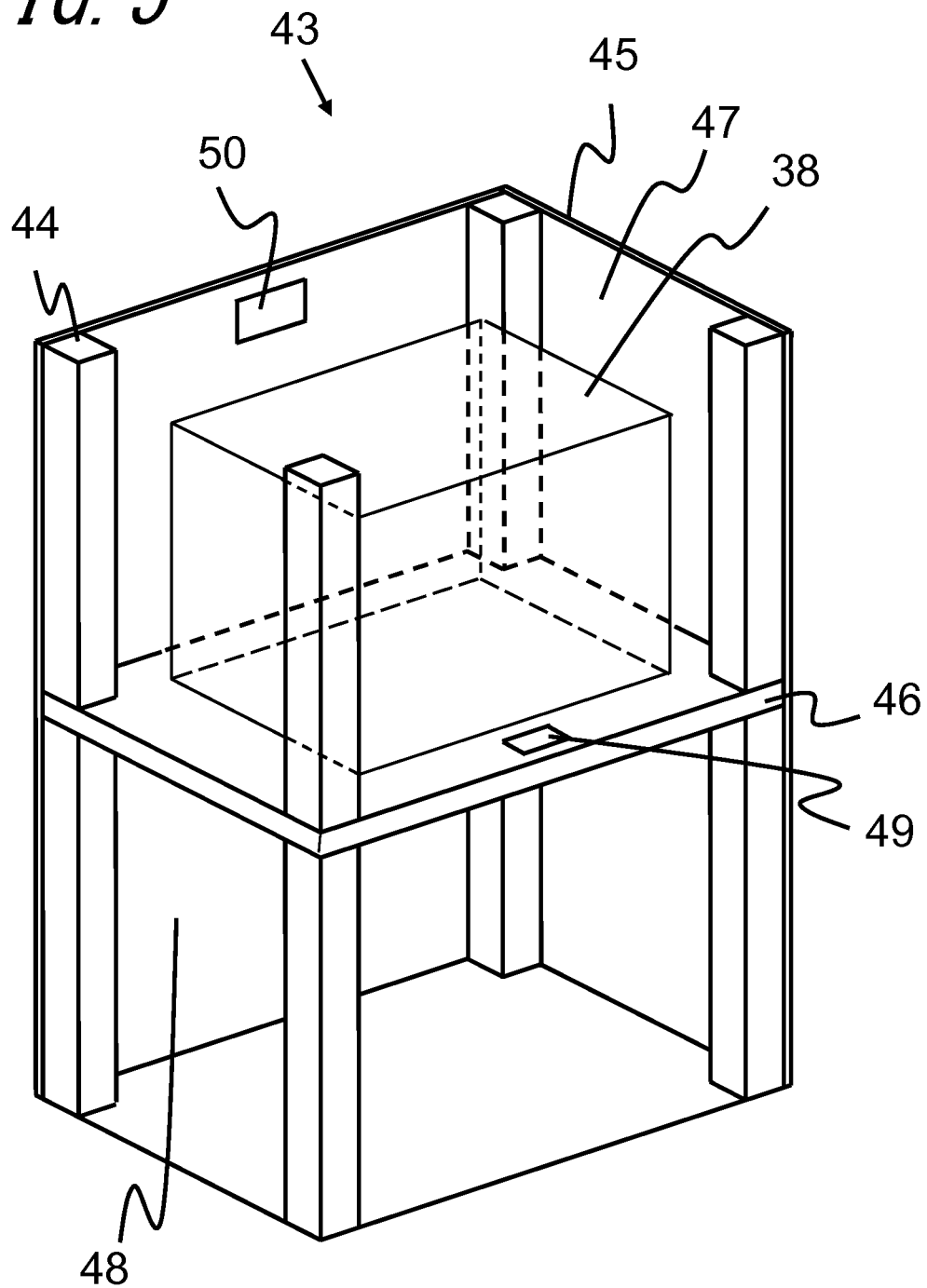
FIG. 5 is an exploded perspective view illustrating an example of a fuel cell device.

FIG. 5 is an exploded perspective view illustrating an example of a fuel cell device in which the fuel cell module 38 shown in FIG. 4 and auxiliary units for operating the fuel cell 1 are housed in an exterior case. Some elements are not shown in FIG. 5.

The fuel cell device 43 shown in FIG. 5 includes an exterior case having columns 44 and exterior plates 45, and the exterior case is vertically partitioned by a partition plate 46. An upper side space of the exterior case is defined as a module receiving chamber 47 receiving the fuel cell module 38 and a lower side space is defined as an auxiliary unit receiving chamber 48 receiving auxiliary units used to operate the fuel cell module 38. In FIG. 5, the auxiliary units received in the auxiliary unit receiving chamber 48 are not shown. The control unit 10 and the pump 11 are received in the auxiliary unit receiving chamber 48.

An air flow port 49 allowing air of the auxiliary unit receiving chamber 48 to flow into the module receiving chamber 47 is formed in the partition plate 46, and an exhaust port 50 exhausting air in the module receiving chamber 47 is formed in a part of the exterior plate 45 constituting the module receiving chamber 47.

In the fuel cell system according to this embodiment, the emergency shutdown mode includes a shutdown transition mode to which the normal power generation mode is shifted after the on-off valve of the fuel gas supply line 9 is closed and the supply of the raw fuel gas to the fuel cell system is stopped, and a shutdown mode which is started after the shutdown transition mode, as shown in FIG. 6(a).

The shutdown transition mode is a mode in which the fuel gas in the pipe downstream from the on-off valve is supplied to the fuel cell 1 at a flow rate smaller than that at the time of generation of electric power so as to be combusted after the supply of the raw fuel gas to the fuel cell system is stopped. In the shutdown transition mode, the control unit 10 controls the pump, the blower, the power conditioner, and the like so as to stop the supply of power to the load, to set a water supply to the reformer 5 to be smaller than that at the time of generation of electric power, and to set an oxygen-containing gas supply to the fuel cell 1 to be smaller than that at the time of generation of electric power.

For example, in the shutdown transition mode, when the on-off valve is closed, the pump 11 supplies the raw fuel gas in the raw fuel line 9b downstream from the on-off valve to the reformer 5 at a flow rate smaller than that at the time of generation of electric power and thus controls the fuel gas to be supplied to the fuel cell 1 at a flow rate smaller than that at the time of generation of electric power.

For example, the control unit 10 controls the pump 11, the blower 12, and the like to supply the fuel gas at a flow rate of 2.3 L/min, the air at a flow rate of 50 L/min, and the water at an S/C of 2.5 at the time of generation of electric power in the power generation mode, and controls the pump, the blower 12, and the like to supply the fuel gas at a flow rate of 0.5 L/min, the air at a flow rate of 30 L/min, and the water at an S/C of 2.5 in the shutdown transition mode.

The shutdown mode is a mode in which the pump 11 is stopped to stop the supply of the raw fuel gas to the reformer 5, to stop the supply of the fuel gas to the fuel cell 1, to stop the supply of water to the reformer 5, and to stop the supply of oxygen-containing gas to the fuel cell 1, thereby completely shutting down the fuel cell system.

The control unit 10 is connected to a storage unit. The storage unit stores the power generation mode, the shutdown transition mode, and the shutdown mode and also stores in what condition the operating mode is shifted to the power generation mode, the shutdown transition mode, and the shutdown mode. The control unit 10 controls the pump, the blower, the power conditions, and the like on the basis of the information from the storage unit.

Conventionally, as shown in FIG. 6(b), when the on-off valve of the security meter 7 is closed and the supply of raw fuel gas to the fuel cell system is stopped due to natural disasters such as an earthquake, a power failure, a striking of a bolt of lightning, or a typhoon, the supply of power to the load is stopped, the pump 11 disposed in the fuel gas supply line 9 is shut down, and the supplies of water and oxygen-containing gas are stopped, at the time point of transmitting a signal representing that the on-off valve is closed to the control unit 10.

However, in the high-temperature operating fuel cell 1, since the supply of raw fuel gas to the reformer 5 is stopped at the time of emergency of natural disasters such as an earthquake, a power failure, a striking of a bolt of lightning, or a typhoon, the fuel gas is not supplied to the fuel cell 1 and thus the combustion gas is not generated. Accordingly, there is a possibility that a rapid temperature variation from a high temperature to a low temperature would occur in the fuel cell 1 and large thermal stress would be generated in the fuel cell 1, particularly, large thermal stress would be generated in the combustion area 15 of the fuel cell 1.

In the fuel cell system according to this embodiment, the shutdown transition mode in which the fuel gas in the fuel gas supply line 9 downstream from the on-off valve is supplied to the fuel cell 1 at a flow rate smaller than that at the time of generation of electric power and is combusted, after the on-off valve of the fuel gas supply line 9 is closed and the supply of raw fuel gas to the fuel cell system is stopped, and the shutdown mode which is started after the shutdown transition mode are employed. Accordingly, as shown in FIG. 6(a), after the on-off valve of the fuel gas supply line 9 is closed and a signal representing that the on-off valve is closed is transmitted to the control unit 10 from the security meter 7, the control unit 10 controls the pump, the blower, the power conditioner, and the like so as to enter the shutdown transition mode and then enter the shutdown mode.

The gas supplied to the fuel cell 1 may be fuel gas at an initial time and then may be raw fuel gas. In the following description, the raw fuel gas may be mentioned to be included in the fuel gas.

In the shutdown transition mode, since the fuel cell 1 slightly generates electric power, the pump 11 is driven using this power. The pump 11 may be driven using a storage battery or a system power source.

The "flow rate smaller than that at the time of generation of electric power" means a flow rate of the fuel gas smaller than that used to generate minimum electric power in the power generation mode in which the electric power generated by the fuel cell 1 is supplied to electric appliances.

That is, when receiving the signal representing that the on-off valve is closed, the control unit 10 generally shuts down the pump 11 to stop the supply of fuel gas to the fuel cell 1. However, in this embodiment, the pump 11 is activated to supply the raw fuel gas in the pipe downstream from the on-off valve to the reformer 5. Accordingly, the fuel gas is supplied to the fuel cell 1.

At this time, since the gas-appliance raw fuel line 9c connected to, for example, the water heater or the gas stove other than the fuel cell system is branched from the raw fuel line 9b, and the fuel cell system communicates with the pipe forming the gas-appliance raw fuel line 9c of the water heater or the gas stove, the raw fuel gas in the gas-appliance raw fuel line connected to the water heater or the gas stove can be suctioned to the fuel cell system, thereby increasing the raw fuel gas supply.

In this case, the supply from the pump 11 is controlled in consideration of the volumes of the pipe of the gas-appliance raw fuel line 9c connected to the water heater or the gas stove and the pipe of the fuel gas supply line 9, so as not to supply air from the gas-appliance raw fuel line 9c connected to the water heater or the gas stove to the fuel cell 1.

The control unit 10 controls the pump 11 so as to supply the raw fuel gas at a flow rate smaller than that at the time of generation of electric power. The pump 11 is driven with electric power generated by the fuel cell 1 in the shutdown transition mode. The control unit 10 controls the pump so as to supply the water used to reform the raw fuel gas to the fuel gas, to the reformer 5, at a smaller flow rate along with the raw fuel gas. Similarly, the blower 12 is controlled to supply the oxygen-containing gas at a smaller flow rate to correspond to the raw fuel gas.

Since water and oxygen-containing gas are supplied at a predetermined flow rate depending on the flow rate of the raw fuel gas, the amount of fuel gas is gradually reduced (shutdown transition mode) and then the shutdown mode is started. Accordingly, since the temperature of the fuel cell 1 is gradually lowered without being rapidly lowered at the time of emergency shutdown, it is possible to reduce the thermal stress generated in the fuel cell 1. Since the fuel gas is supplied to the fuel electrode layer 23 of the fuel cell 1 for a predetermined time after the emergency shutdown, the fuel electrode layer 23 is not exposed to the oxygen-containing gas in a high-temperature state and it is thus possible to reduce oxidation of the fuel electrode layer 23.

Since water and oxygen-containing gas in addition to the fuel gas are supplied to the fuel cell 1 or the reformer 5, the same conditions as in generating electric power can be achieved and it is thus possible to reduce an adverse influence of different conditions on the fuel cell 1.

In this embodiment, in the shutdown transition mode, the supply of power to the load is stopped and the fuel gas supply, the water supply, and the oxygen-containing gas supply are set to flow rates smaller than those at the time of generation of electric power. However, as shown in FIG. 7, the supply of power to the load may be stopped and the supply of water and oxygen-containing gas to the fuel cell 1 or the reformer 5 may be stopped. In this case, the fuel gas downstream from the reformer 5 is first supplied to the fuel cell and then the raw fuel gas upstream from the reformer 5 is supplied to the fuel cell. The fuel gas (or raw fuel gas) supplied to the fuel cell 1 is combusted by reacting with the oxygen-containing gas existing in the housing 3, and the oxygen-containing gas is not supplied even when the fuel gas supply (or raw fuel gas supply) is reduced, thereby reducing oxidation of the fuel electrode layer 23 of the fuel cell 1.

Just after the emergency shutdown, the fuel gas supply is set to be smaller than that at the time of generation of electric power, but as shown in FIG. 8(a), by causing a small amount of fuel gas to continuously flow for the time t1 and then to intermittently flow for the time t2, the amount of fuel gas combusted is gradually reduced, thereby reducing the thermal stress in the fuel cell 1. As shown in FIG. 8(b), by causing a small amount of fuel gas to continuously flow for the time t1, to intermittently flow for the time t3, and then to intermittently flow with an elongated interval for the time t4, it is possible to further reduce the thermal stress in the fuel cell 1.

When the fuel gas intermittently flows, the combustion flame may be extinguished in a time zone in which the fuel gas is not supplied and it is thus preferable that the fuel gas is ignited using an ignitor whenever the fuel gas flows. From the viewpoint of not extinguishing the combustion flame, it is preferable that the fuel gas is continuously supplied.

Figure 9:
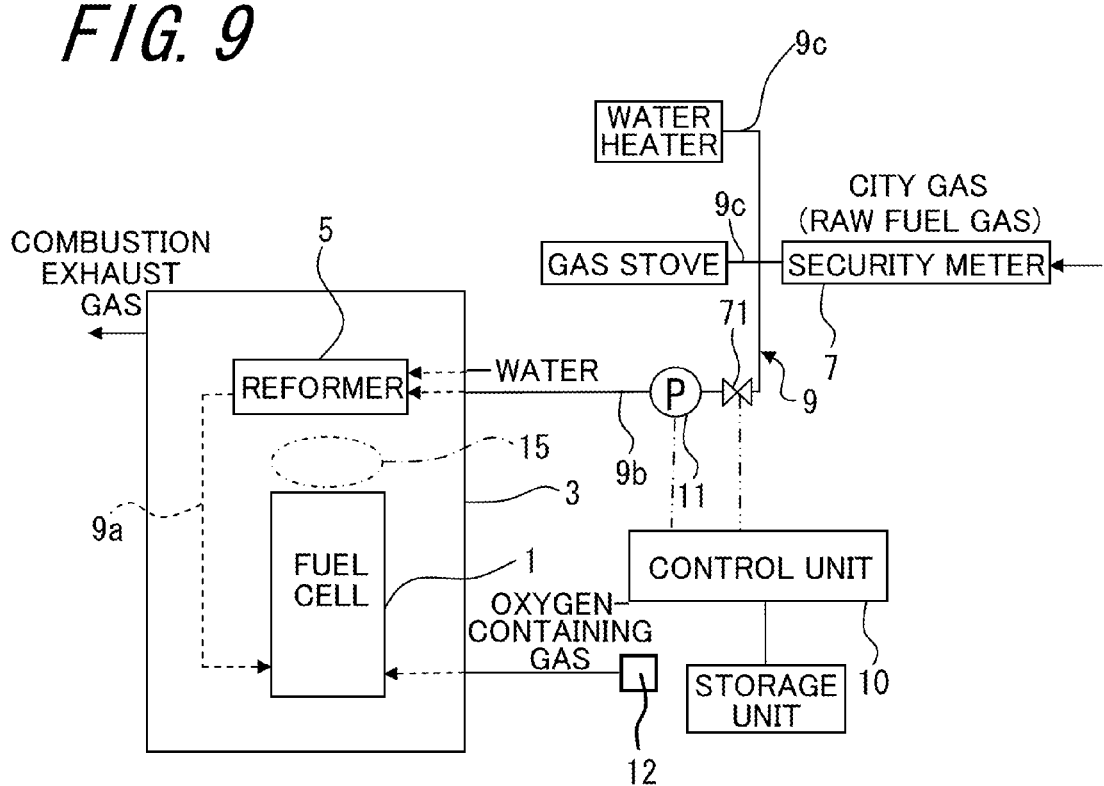
FIG. 9 is a diagram illustrating another example of the fuel cell system in which an on-off valve is disposed in a raw fuel line other than a security meter.

It has been described in the above-mentioned embodiment that the security meter 7 includes the on-off valve, but as shown in FIG. 9, an on-off valve 71 may be disposed upstream from the pump 11 in the raw fuel line 9b independently of the security meter 7 having the on-off valve, and the control unit 10 may control the on-off valve 71 so as to be closed at the time of emergency shutdown. In this case, by disposing the on-off valve 71 downstream from the connecting portion of the gas-appliance raw fuel line 9c connected to the water heater or the gas stove to the raw fuel line 9b, the fuel gas supply line 9 does not communicate with the gas-appliance raw fuel line 9c, and it is thus possible to prevent air from being supplied to the fuel cell 1 via the gas-appliance raw fuel line 9c. In this case, even when the security meter 7 does not include the on-off valve, the same advantages can be achieved.

Figure 10:
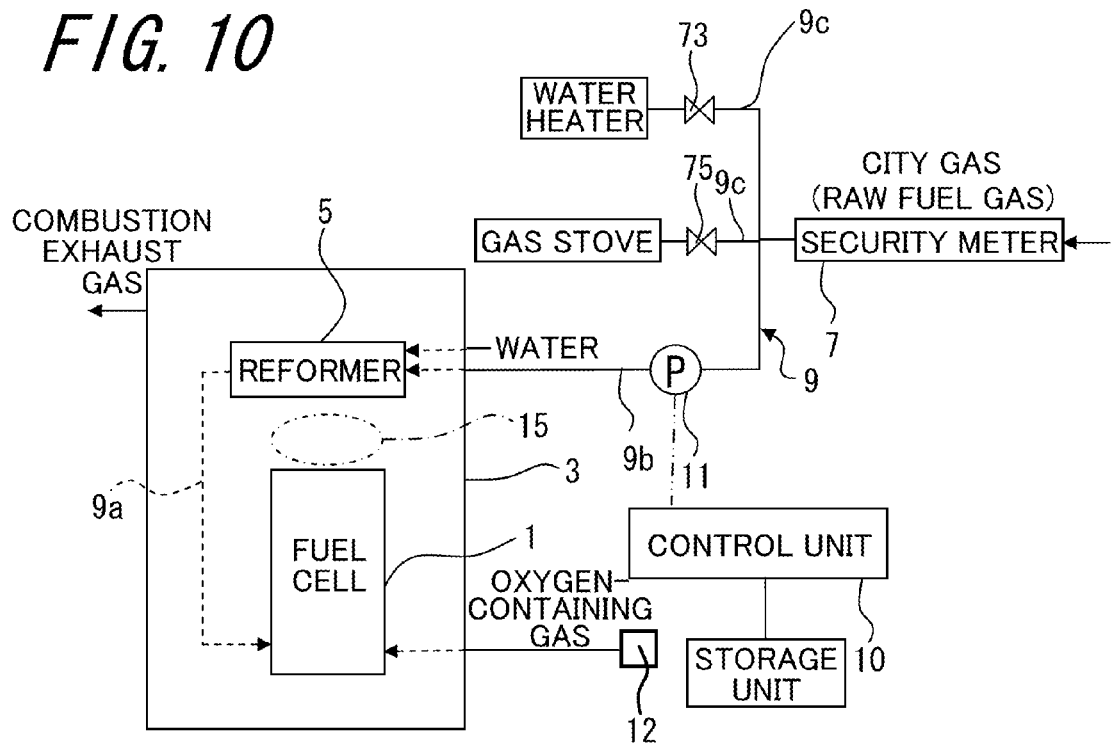
FIG. 10 is a diagram illustrating another example of the fuel cell system in which a gas-appliance on-off valve is disposed in a gas-appliance raw fuel line of a water heater and a gas stove.

As shown in FIG. 10, independently of the security meter 7, gas-appliance on-off valves 73 and 75 may be disposed in the gas-appliance raw fuel lines 9c, respectively and the control unit 10 may control the on-off valves so as to be closed at the time of emergency shutdown. That is, by closing the gas-appliance on-off valves 73 and 75 at the time of emergency shutdown, the fuel gas supply line 9 does not communicate with the gas-appliance raw fuel lines 9c connected to the water heater and the gas stove, and it is thus possible to prevent air from being supplied to the fuel cell 1 via the gas-appliance raw fuel lines 9c. In addition, since the raw fuel gas upstream from the on-off valves 73 and 75 can be suctioned by the pump 11, it is possible to supply the fuel gas to the fuel cell 1 for a longer time.

Figure 11:
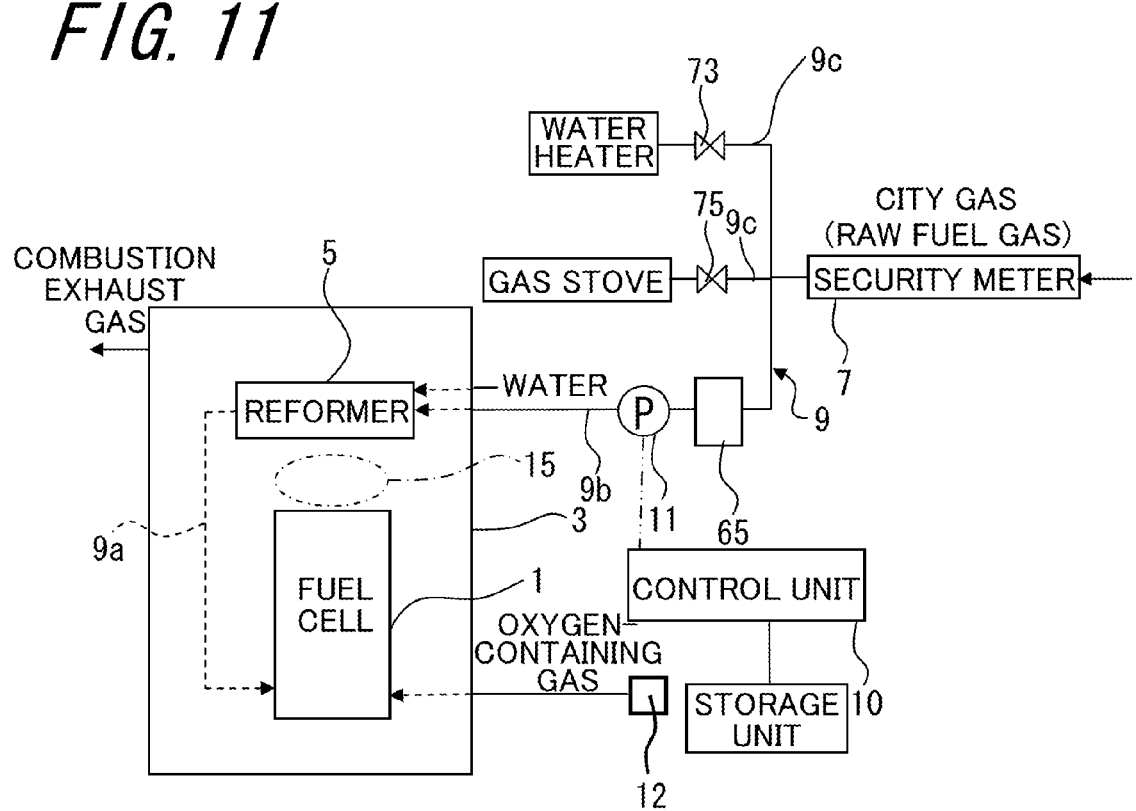
FIG. 11 is a diagram illustrating another example of the fuel cell system in which a reserve tank is disposed in a raw fuel line.

It has been described in the above-mentioned embodiment that the raw fuel gas in the pipe downstream from the on-off valve is forcibly supplied to the reformer 5 by the use of the pump 11, but as shown in FIG. 11, a reserve tank 65 storing raw fuel gas may be connected to the raw fuel line 9b of the fuel gas supply line 9 and the raw fuel gas in the reserve tank 65 may be supplied to the reformer 5 via the raw fuel line 9b when the on-off valve is closed. In this case, an extra load is not applied to the pump 11, and the raw fuel gas supply and the supply time thereof can be controlled by changing the capacity of the reserve tank 65. In FIG. 11, the on-off valve may be disposed downstream from the connecting portion of the gas-appliance raw fuel line 9c to the raw fuel line 9b in the fuel gas supply line 9 upstream from the reserve tank 65. In this case, the on-off valves 73 and 75 are unnecessary.

When the on-off valve is disposed upstream from the pump 11, the downstream side from the on-off valve has a negative pressure by suction of the pump 11, and thus the raw fuel gas supply from the pump 11 depends on the driving force of the pump 11 corresponding to the negative pressure.

In the above-mentioned embodiment, the reformer 5 is housed in the housing 3, but the reformer 5 may be disposed outside the housing 3.

In the above-mentioned embodiment, the signal representing that the on-off valve of the security meter 7 is closed is transmitted to the control unit 10. However, for example, a pressure sensor that senses the pressure of the raw fuel gas may be disposed in the raw fuel line 9b, and when the pressure of the raw fuel line 9b is rapidly lowered, this may be considered to be a situation where the on-off valve is closed and the supply of raw fuel gas is stopped, and then the signal may be transmitted from the pressure sensor to the control unit 10. Even when a flow rate sensor that detects a flow rate of the raw fuel gas is disposed in the raw fuel line 9b instead of the pressure sensor that senses the pressure of the raw fuel gas, the same advantages can be achieved.

The fuel cell system should also undergo emergency shutdown when performing maintenance on the fuel cell system. In this case, the on-off valve of the security meter 7 is left open, but the same emergency shutdown mode as in the above-mentioned embodiment in which the on-off valve of the security meter 7 is closed may be employed.

That is, when a unit other than the pump 11 in the fuel gas supply line 9, for example, a flowmeter, is out of order and maintenance is performed thereon, the emergency shutdown mode is constructed by the shutdown transition mode in which the supply of power to a load is stopped and the fuel gas supply, the water supply, and the oxygen-containing gas supply is controlled so as to be smaller than those at the time of generation of electric power and the shutdown mode thereafter.

When performing maintenance, the shutdown transition mode and the shutdown mode subsequent thereto can be entered as described above, for example, by pressing a maintenance button. At the time of maintenance, the fuel gas supply, the water supply, and the oxygen-containing gas supply can be controlled by the use of the pump or the blower. Accordingly, by controlling them, it is possible to control the supplies and the supply times.

The invention is not limited to the above-mentioned embodiment, but various modifications and changes are possible without departing from the scope of the invention.

In the above-mentioned embodiment, the fuel cell employing hollow plate-like solid oxide fuel battery cells is exemplified, but a fuel cell employing cylindrical solid oxide fuel battery cells may be used. The invention can be also applied to such a type of plate-like fuel cell in which plural stacked members of a plate-like fuel battery cell in which a fuel electrode layer, a solid electrolyte layer, and an oxygen electrode layer are sequentially stacked, a fuel-side interconnector connected to the fuel electrode layer, and an oxygen-side interconnector connected to the oxygen electrode layer are stacked with a partition plate interposed therebetween, fuel gas and oxygen-containing gas are supplied to the central portions of the fuel electrode layer and the oxygen electrode layer and flow to the outer circumference of the fuel electrode layer and the oxygen electrode layer, and surplus fuel gas and oxygen-containing gas are discharged and combusted from the outer circumference of the fuel battery cells.

REFERENCE SIGNS LIST

1: Fuel cell
7: Security meter

9: Fuel gas supply line
9a: Reformed fuel line
9b: Raw fuel line
9c: Gas-appliance raw fuel line
10: Control unit
20: Fuel battery cell
21: Conductive support
22: Fuel gas flow channel
23: Fuel electrode layer
24: Solid electrolyte layer
26: Air electrode layer
28: Interconnector
38: Fuel cell module
43: Fuel cell device
71, 73, 75: On-off valve

The invention claimed is:

1. A method of operating a fuel cell system including a fuel cell that generates electric power using fuel gas and oxygen-containing gas and combusts fuel gas remaining unused for generation of electric power, a fuel gas supply line that supplies the fuel gas to the fuel cell, and an on-off valve that is disposed in the fuel gas supply line, the method comprising:
when the on-off valve of the fuel gas supply line is closed and the fuel cell undergoes emergency shutdown,
a first step of continuously supplying for a predetermined time the fuel gas in the fuel gas supply line downstream from the on-off valve to the fuel cell at a flow rate smaller than that at a time of generation of electric power;
a second step of intermittently supplying the fuel gas at the smaller flow rate after the first step, wherein intermittently supplying the fuel gas includes alternating between a time period in which the fuel gas is supplied and a time period in which the fuel gas is not supplied, for more than one cycle, wherein the fuel gas is ignited using an ignitor during the time period in which the fuel gas is supplied; and
a third step of stopping the supply of the fuel gas to the fuel cell after the second step.

2. The method according to claim 1, wherein
the fuel cell system includes a reformer that reforms raw fuel gas with steam to obtain the fuel gas to be supplied to the fuel cell, and a blower that supplies the oxygen-containing gas to the fuel cell, and
the method further comprises, when the fuel gas is supplied to the fuel cell at a flow rate smaller than that at a time of generation of electric power, supplying water to the reformer at a flow rate smaller than that at the time of generation of electric power, and supplying the oxygen-containing gas to the fuel cell by means of the blower at a flow rate smaller than that at the time of generation of electric power.

3. The method according to claim 1, wherein
the fuel gas supply line includes a raw fuel line that supplies the raw fuel gas to the fuel cell, and the raw fuel line includes a reserve tank that stores the raw fuel gas, and
when the on-off valve is closed, the raw fuel gas inside the reserve tank is supplied to the fuel cell.

4. A method of operating a fuel cell system including a fuel cell that generates electric power using fuel gas and oxygen-containing gas and combusts fuel gas remaining unused for generation of electric power, a fuel gas supply line that supplies the fuel gas to the fuel cell, and an on-off valve that is disposed in the fuel gas supply line, the method comprising:
when the on-off valve of the fuel gas supply line is closed and the fuel cell undergoes emergency shutdown,
a first step of continuously supplying for a predetermined time the fuel gas in the fuel gas supply line downstream from the on-off valve to the fuel cell at a flow rate smaller than that at a time of generation of electric power;
a second step of intermittently supplying the fuel gas at the smaller flow rate after the first step, wherein intermittently supplying the fuel gas includes alternating between a time period in which the fuel gas is supplied and a time period in which the fuel gas is not supplied, for more than one cycle, wherein, during at least the time period in which the fuel gas is not supplied, a combustion flame is extinguished; and
a third step of stopping the supply of the fuel gas to the fuel cell after the second step.

* * * * *